United States Patent
Sugawara

(10) Patent No.: US 7,238,933 B2
(45) Date of Patent: Jul. 3, 2007

(54) LIGHT DETECTING APPARATUS

(75) Inventor: Takashi Sugawara, Yokohama (JP)

(73) Assignee: Victor Company of Japan, Limited, Yokohama, Kanagawa-ken (JP)

(*) Notice: Subject to any disclaimer, the term of this patent is extended or adjusted under 35 U.S.C. 154(b) by 587 days.

(21) Appl. No.: 10/891,514

(22) Filed: Jul. 15, 2004

(65) Prior Publication Data

US 2005/0036187 A1    Feb. 17, 2005

(30) Foreign Application Priority Data

Aug. 13, 2003 (JP) ............................ P2003-292950

(51) Int. Cl.
  *H01J 3/14* (2006.01)
  *G02B 26/08* (2006.01)
(52) U.S. Cl. .................... 250/234; 250/206.1; 359/197
(58) Field of Classification Search ........ 250/234–236, 250/206.1, 206.2, 216; 359/197–199, 201–202, 359/212, 223, 876

See application file for complete search history.

(56) References Cited

U.S. PATENT DOCUMENTS 6,856,437 B2 * 2/2005 Witt et al. ................. 359/198

FOREIGN PATENT DOCUMENTS

JP    2003-008515    1/2003

* cited by examiner

*Primary Examiner*—Kevin Pyo
(74) *Attorney, Agent, or Firm*—The Nath Law Group; Jerald L. Meyer; Derek Richmond

(57) ABSTRACT

A light detecting apparatus has a two-axis deflector such as a two-axis mirror capable of controlling the deflection of a light beam. The apparatus realizes a sure and speedy light beam search operation without increasing deflecting frequencies of the two-axis deflector. In the light detecting apparatus, a digital signal processor (3) generates two periodic signals having different frequencies to separately control deflective operations in two axial directions of the two-axis deflection mirror (1). A light beam from the two-axis deflection mirror (1) draws a locus on a two-dimensional position sensitive detector (2). Along the locus, the search operation is carried out to find an orientation of a light emitting element that emits a light beam toward the two-axis deflection mirror (1).

4 Claims, 14 Drawing Sheets m=1.0 (INTEGER RATIO 1:1)

m=1.50 (2:3)

m=1.10 (10:11)

m=1.003 (1000:1003)

m=1.18 (50:59)

(f) m=$\sqrt{2}$ (NON-INTEGER RATIO)

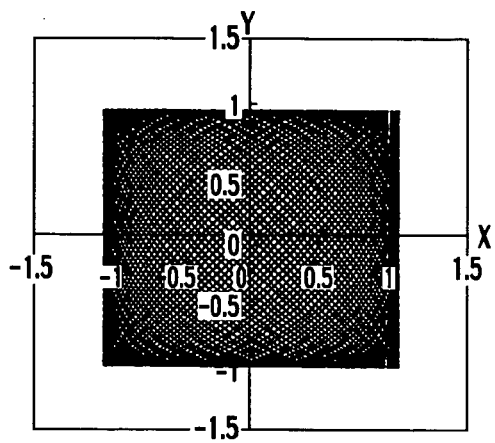
m=1.18 (INTEGER RATIO 50:59)
Fx=50,Fy=59(Hz)
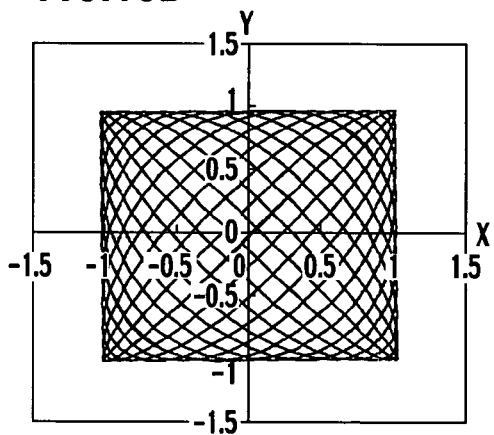
m=1.16 (INTEGER RATIO 25:29)
Fx=50,Fy=58(Hz)
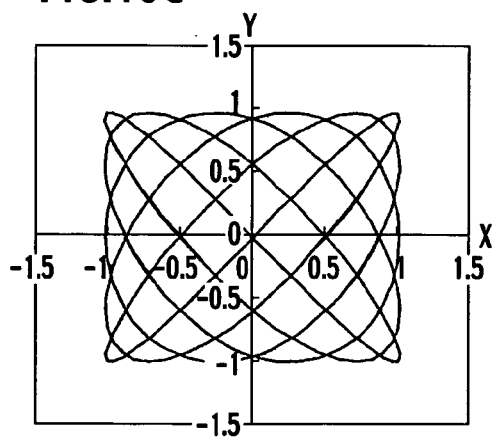
m=1.20 (INTEGER RATIO 5:6)
Fx=50,Fy=60(Hz)

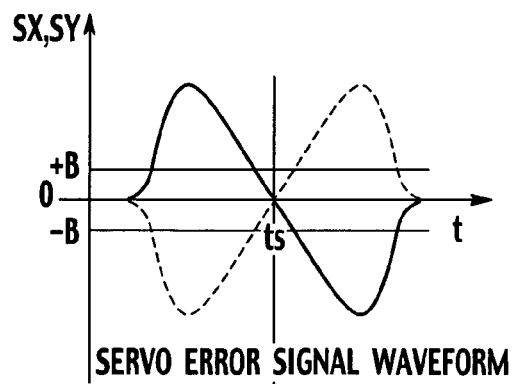
FIG.11A
SERVO ERROR SIGNAL WAVEFORM
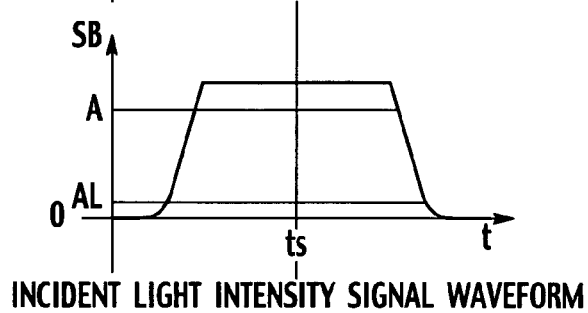
FIG.11B
INCIDENT LIGHT INTENSITY SIGNAL WAVEFORM
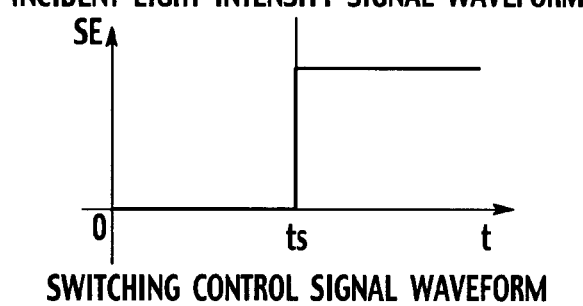
FIG.11C
SWITCHING CONTROL SIGNAL WAVEFORM
FIG.12A
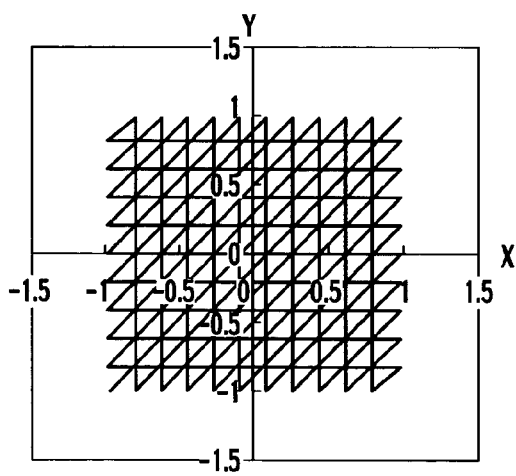
X- AND Y-AXES: TRIANGLE WAVES
m=1.10 (INTEGER RATIO 10:11)
FIG.12B
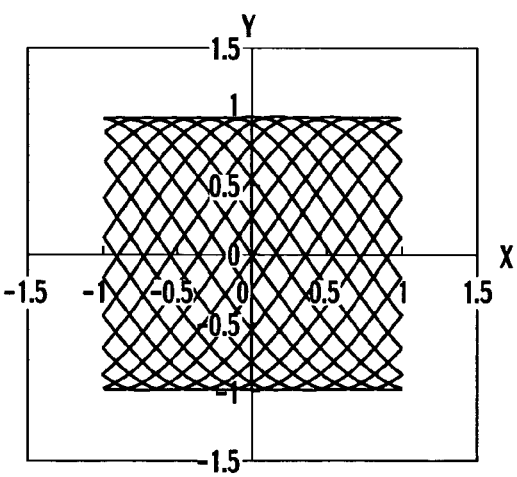
X-AXIS: TRIANGLE WAVE Y-AXIS: SINE WAVE
m=1.10 (INTEGER RATIO 10:11)

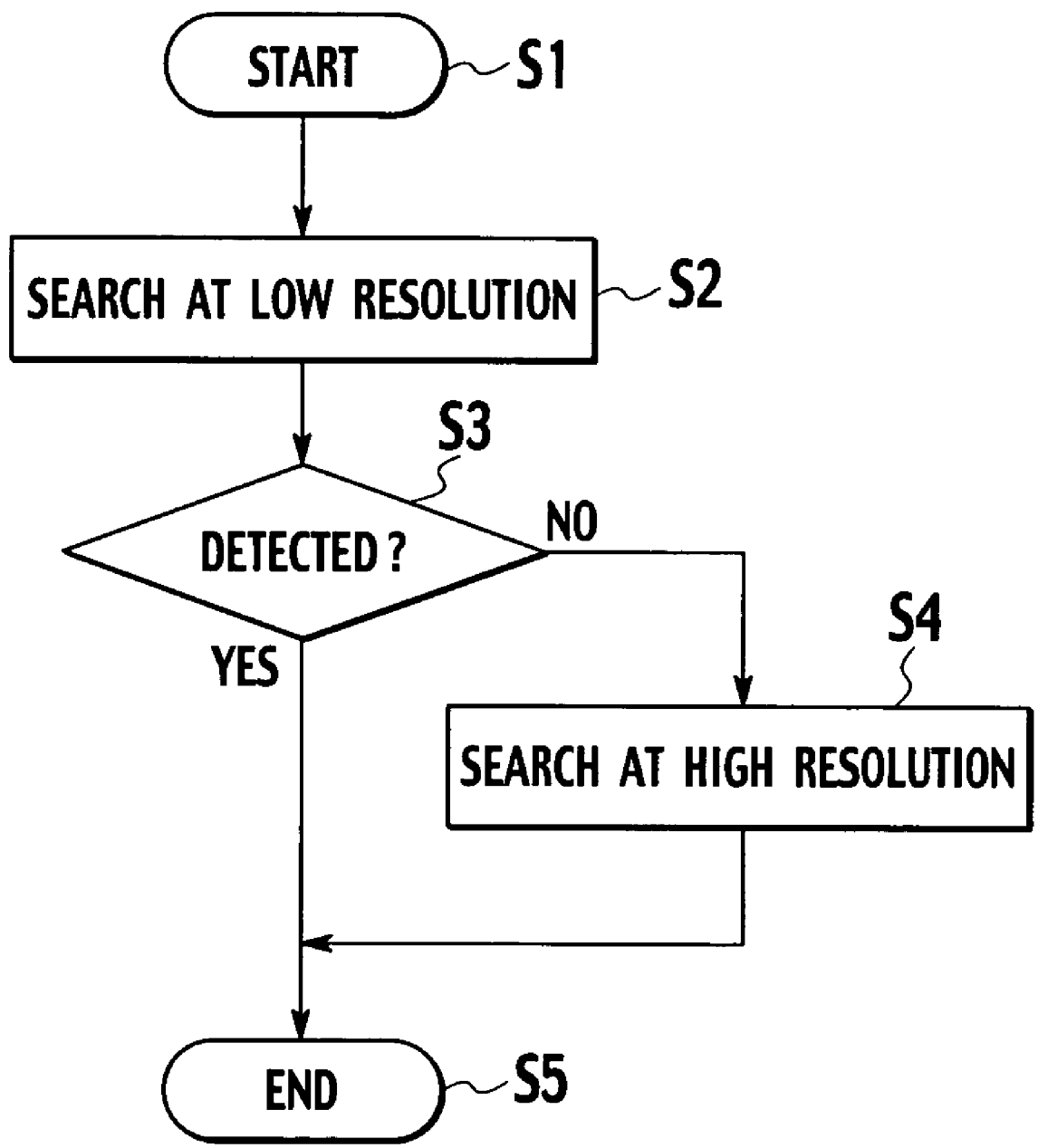

LIGHT DETECTING APPARATUS

FIELD OF THE INVENTION

The present invention relates to a light detecting apparatus for detecting an orientation of a light emitting element and automatically adjusting an optical axis according to the detected orientation. The light detecting apparatus is used in, for example, a light receiving/emitting module for optical wireless communication.

BACKGROUND OF THE INVENTION

In recent years, optical wireless transmission technology has attracted attention as means for transmitting information signals with light. The optical wireless transmission technology includes, for example, an optical wireless LAN to communicate information among a plurality of computers and a technique to transmit video and audio information to audio-visual devices. The optical wireless transmission transmits and receives optical beams modulated by digital information among devices each having a receiver-emitter.

To correctly communicate information with the optical wireless transmission, optical axes must be aligned between the receiver-emitters. Namely, each receiver-emitter must have an optical axis adjusting function.

If a light beam emitted from a light emitting element on a transmission side has no directivity, optical axis adjustment must be carried out by a photodetector on a reception side. If the light emitting element on the transmission side has directivity, optical axis adjustment must be carried out on each of the transmission and reception sides. To carry out high-speed communication in a gigahertz band, securing a transmission S/N ratio is important. For this, a light beam having a small diameter is employed and precise optical axis adjustment is needed.

An optical axis adjusting mechanism to realize a precision optical axis adjusting function is disclosed in Japanese Patent Application Laid-Open Publication No. 2003-8515. According to this disclosure, a two-axis driving mechanism supports a light receiver-emitter and deflects a light receiving/emitting direction of the light receiver-emitter in a direction defined by two axes.

There is a light detecting apparatus having an angle controlling mechanism. To reduce the size of a communication system and adjust an optical axis at high speed, this apparatus employs a mirror that is deflected along two axes. With this mirror, the apparatus makes a light beam incident to a photodetector on a reception side. In this apparatus, the mirror is deflected in a direction defined by two axes to search for an orientation of a light emitting element installed on a transmission side and align optical axes between the light emitting element and the photodetector.

To carry out the search operation of finding an orientation of the light emitting element installed on the transmission side, the light detecting apparatus monitors a light intensity detected by the photodetector on the reception side, deflects the mirror according to preset conditions, stores an orientation of the mirror when the detected light intensity reaches a maximum, and adjusts the mirror in the stored orientation after completing the mirror deflecting operation based on the preset conditions.

To more precisely control optical axes with this light detecting apparatus, a light beam from the light emitting element on the transmission side is made incident to a two-dimensional position detector through the mirror that is deflectable along two axes. According to an incident position of the light beam on the two-dimensional position detector, the light detecting apparatus feedback-controls a deflecting direction of the mirror. This is closed loop control that can precisely adjust optical axes between the light emitting element and the photodetector.

The light detecting apparatus mentioned above employs an angle controlling mechanism including the deflection mirror and two-dimensional position detector. The closed loop control of the apparatus is achievable only when a light beam is made incident to the two-dimensional position detector. If the light beam is out of the two-dimensional position detector due to a large optical axis deviation, the apparatus is unable to achieve the closed loop control. Accordingly, this type of light detecting apparatus needs, if an optical axis deviation is large, to carry out a search operation until an optical beam is made incident to the two-dimensional position detector, before conducting a servo lock operation.

The search operation by the light detecting apparatus is required to surely and quickly find an orientation of a light emitting element installed on a transmission side. For this, the search operation must be carried out for a wide range of angles at high speed or high frequency. In addition, the light detecting apparatus must be capable of deflecting the deflection mirror for a wide range of angles at high speed or high frequency.

The speed (frequency) of deflecting the mirror is restricted by the mechanical characteristics of the mirror. When the mirror is deflected at high speed (high frequency), the mirror may abnormally vibrate due to mechanical resonance, to deteriorate the search operation. This problem becomes more obvious when the mirror is deflected more widely.

Due to the problem, the light detecting apparatus of the related art is unable to sufficiently increase a mirror deflecting speed (frequency), or shorten a search time, or decrease an optical axis adjusting time. When the diameter of a light beam emitted from the light emitting element on the transmission side is small, a high-density search operation is needed, and the related art needs a very long time to carry out such a high-density search operation.

SUMMARY OF THE INVENTION

In order to solve these problems, an object of the present invention is to provide a light detecting apparatus having a two-axis deflector or a two-axis mirror that can control the deflection of an incident light beam. The apparatus is capable of surely and speedily conducting a light beam search operation without increasing a deflecting frequency of the two-axis deflector.

In order to accomplish the object, an aspect of the present invention provides a light detecting apparatus having a two-axis deflector configured to deflect an incident light beam in a direction defined by two axes, a two-dimensional position detector configured to two-dimensionally detect an incident position on the detector of the deflected light beam from the two-axis deflector, and a search controller configured to generate a search control signal that controls the two-axis deflector. The search controller conducts a search operation for finding an incident direction of a light beam made incident to the two-axis deflector by generating, as the search control signal, two periodic signals having different frequencies, by providing the two-axis deflector with the generated periodic signals, by independently controlling, with the periodic signals, deflective operations of the two-axis deflector along the two axes so that a deflected light beam from the two-axis deflector is made incident to the two-dimensional position detector, and by detecting an incident position of the deflected light beam on the two-dimensional position detector.

In the light detecting apparatus, the search controller detects an incident position of a light beam on the two-dimensional position detector according to a locus along which the two-axis deflector is moved, and according to the detected incident position, finds an orientation of a light emitting element that emits a light beam toward the two-axis deflector. The light detecting apparatus can surely and speedily find the orientation of the light emitting element.

The periodic signals are preferably sine- or triangle-wave signals. If the periodic signals are sine-wave signals and if a frequency ratio of the sine-wave signals is a rational number (a number expressible with a quotient of two integers), the locus mentioned above will be a Lissajous figure. The frequency ratio of the periodic signals may be an irrational number instead of a rational number.

In the light detecting apparatus, a frequency ratio of the two periodic signals having different frequencies and serving as the search control signal is expressed with a set of disjoint (coprime) integers. The search controller carries out the search operation at a first resolution that is proportional to a product of the disjoint integers, and if the search operation is unable to detect an incident position of a light beam on the two-dimensional position detector, repeats the search operation at a second resolution that is higher than the first resolution.

It is preferable to repeat the search operation by sequentially increasing the resolution until an incident position of a light beam is detected on the two-dimensional position detector.

In the light detecting apparatus, the search controller sequentially increases a resolution and repeats the search operation until an incident position of a light beam is detected on the two-dimensional position detector. This improves the efficiency and speed of finding an orientation of the light emitting element.

The light detecting apparatus may have a servo error signal generator configured to generate, according to an output from the two-dimensional position detector, a servo error signal corresponding to an incident position of a light beam detected on the two-dimensional position detector, a servo controller configured to control the two-axis deflector according to the servo error signal so that a light beam is made incident to a predetermined position on the two-dimensional position detector, and a signal switching unit configured to switch a signal to be input to the two-axis deflector between a signal from the servo controller and a signal from the search controller. The signal switching unit switches, according to a level of the servo error signal generated by the servo error signal generator, the search operation in which a signal from the search controller is input to the two-axis deflector and a servo operation in which a signal from the servo controller is input to the two-axis deflector from one to another.

In the light detecting apparatus, the signal switching unit switches the search operation and servo operation from one to another according to a level of the servo error signal generated by the servo error signal generator. After finding an orientation of the light emitting element through the search operation, an optical axis of the two-axis deflector can speedily be aligned with the orientation of the light emitting element.

The two-axis deflector may be a two-axis deflection mirror. Two periodic signals having different frequencies are generated and input to the two-axis deflection mirror, to independently control deflective operations of the mirror along two axes.

A frequency ratio of the two periodic signals having different frequencies and serving as the search control signal is expressible with a set of disjoint integers. The two-axis deflection mirror carries out the search operation at a first resolution that is proportional to a product of the disjoint integers, and if the search operation is unable to detect an incident position of a light beam, repeats the search operation at a second resolution that is higher than the first resolution. It is preferable to repeat the search operation by successively increasing the resolution until an incident position of a light beam is detected.

It is preferable that the frequency ratio of the two periodic signals is a rational number.

The light detecting apparatus of the present invention with the two-axis deflector for deflecting an incident light beam is capable of surely and speedily executing the search operation without increasing the deflecting frequency of the two-axis deflector.

BRIEF DESCRIPTION OF THE DRAWINGS

Figure 1:
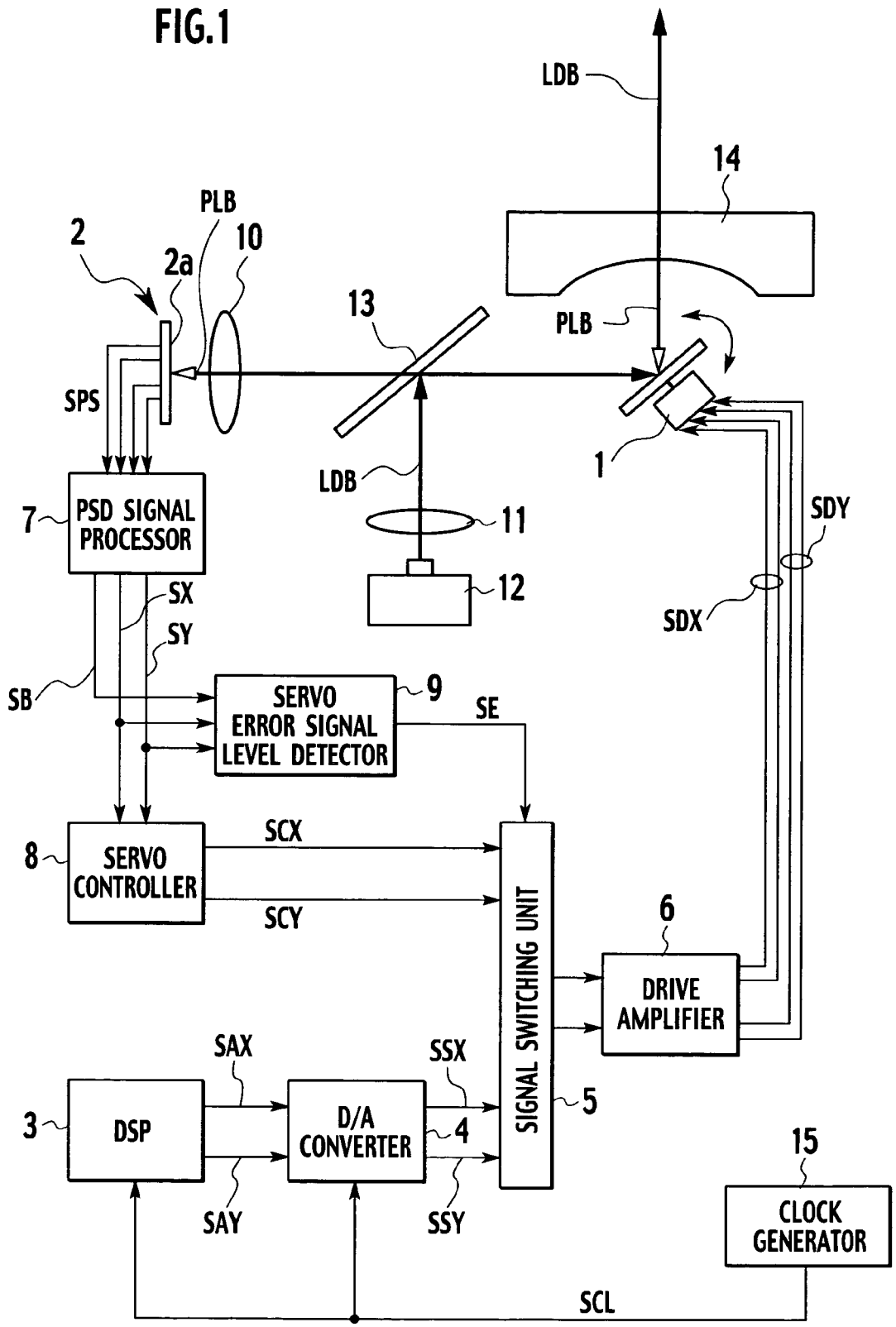
Figure 2:
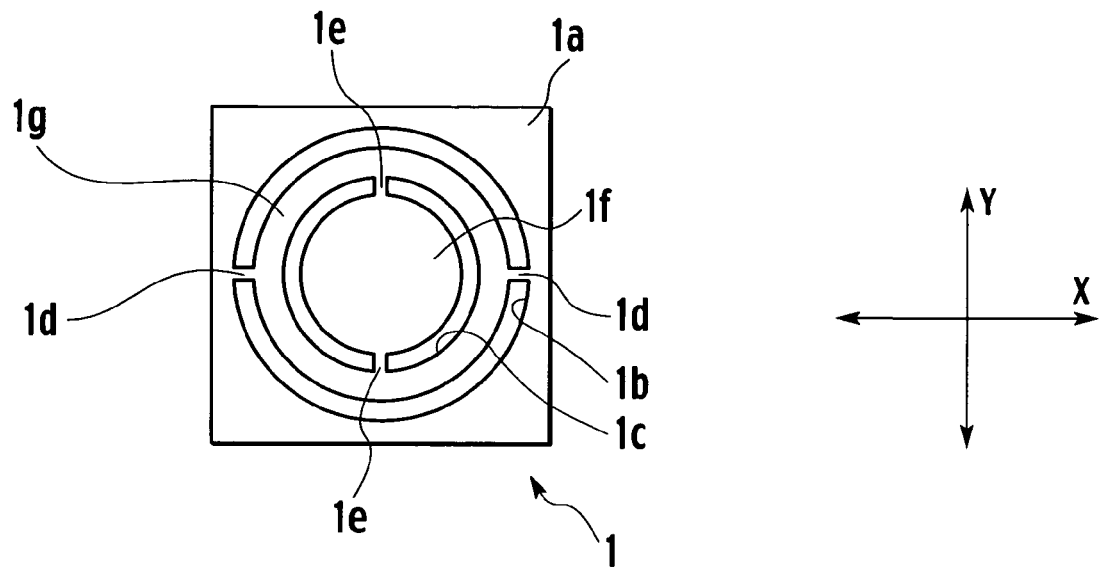
Figure 3:
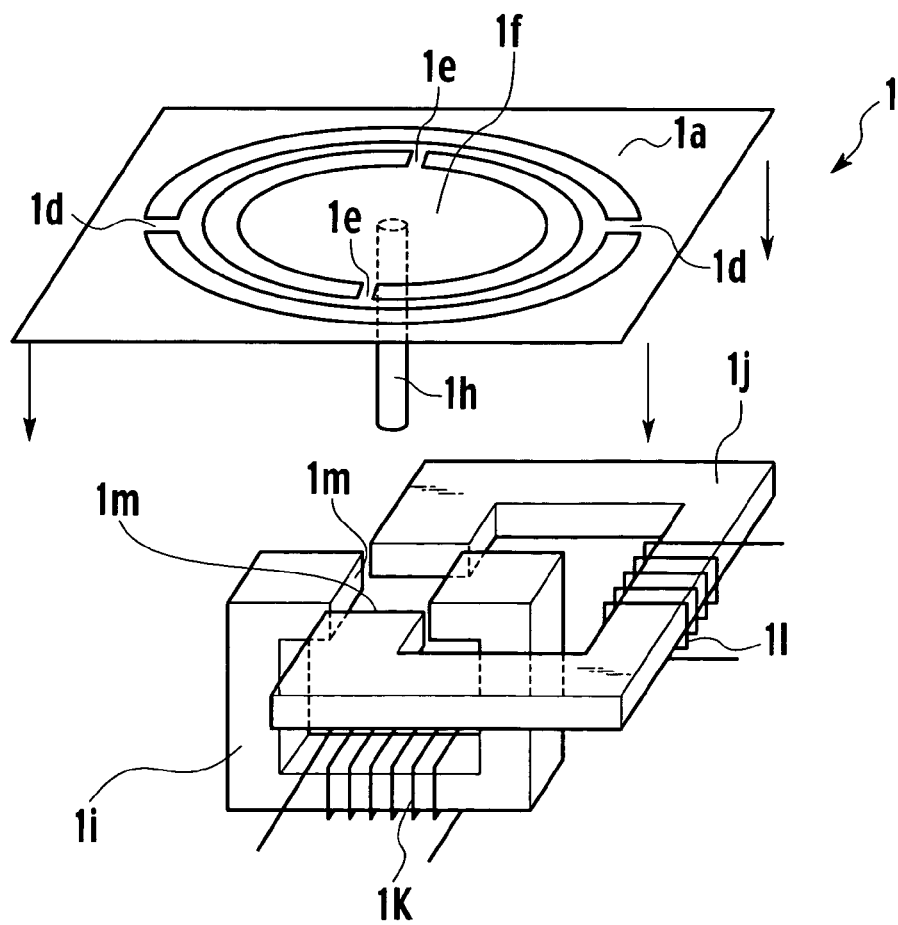
Figure 4:
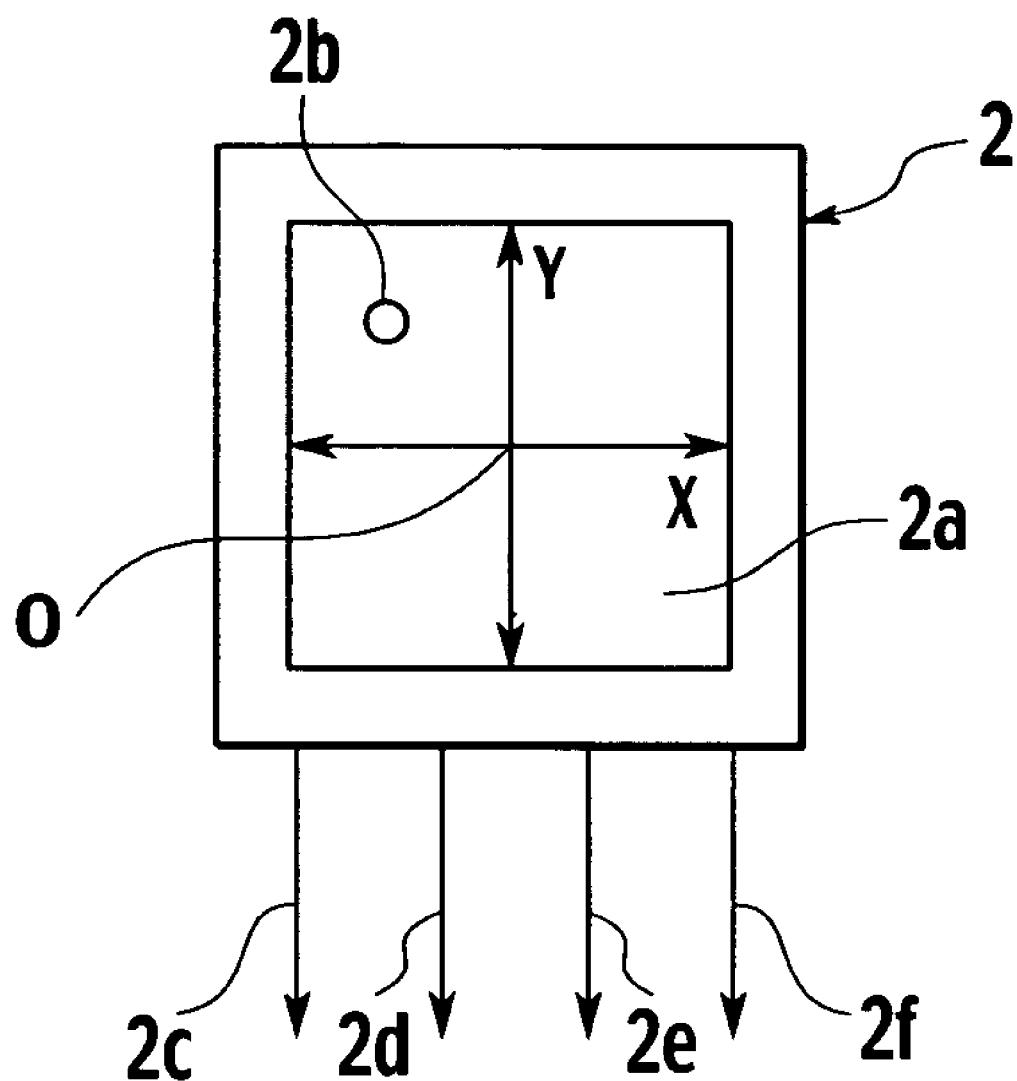
Figure 5:
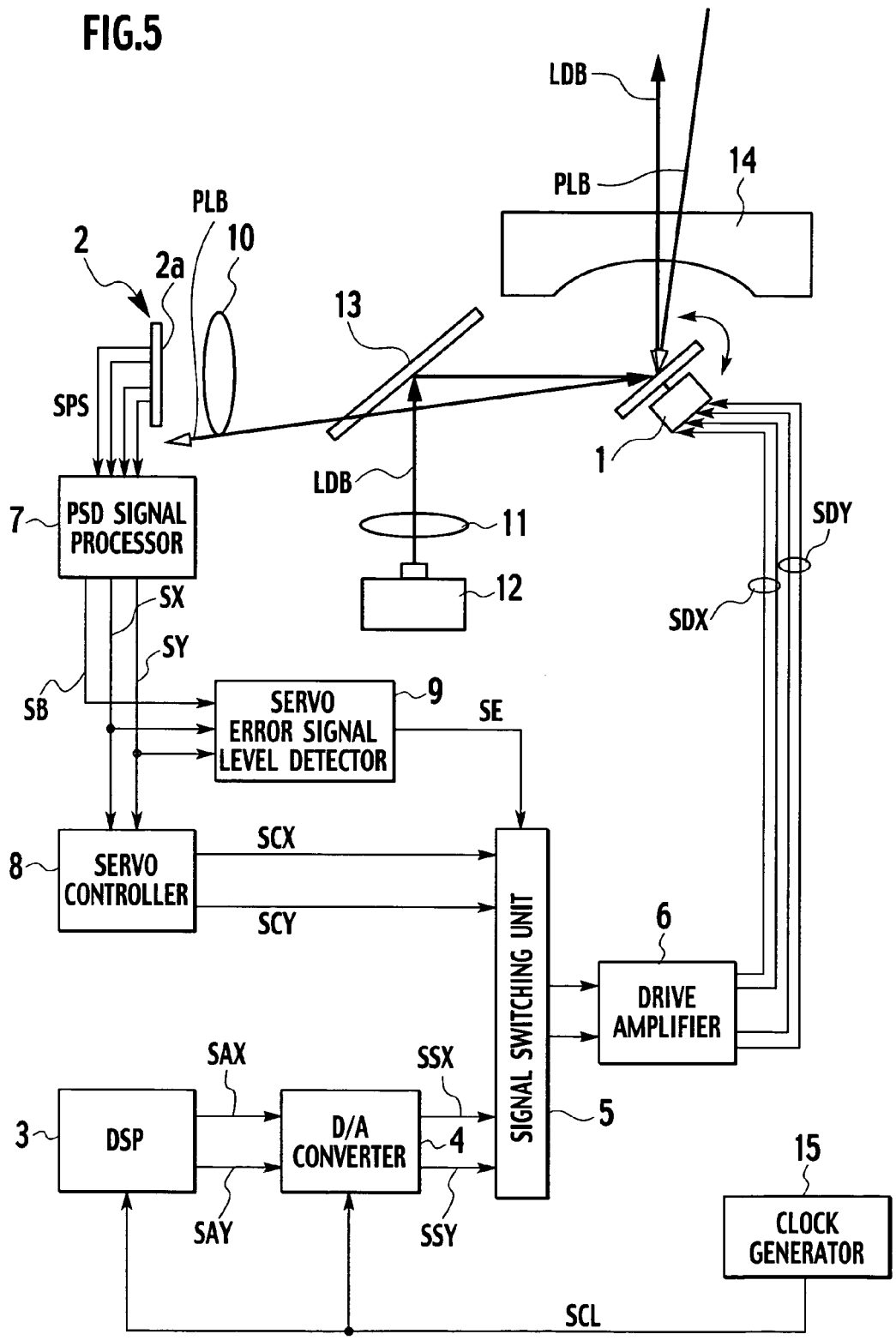
Figure 6:
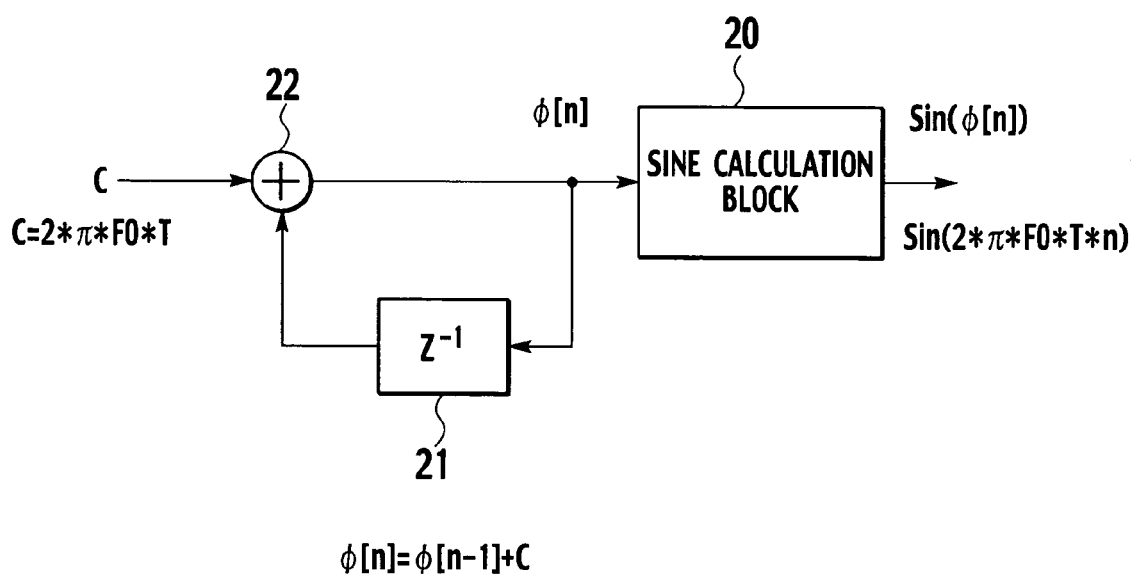
Figure 7:
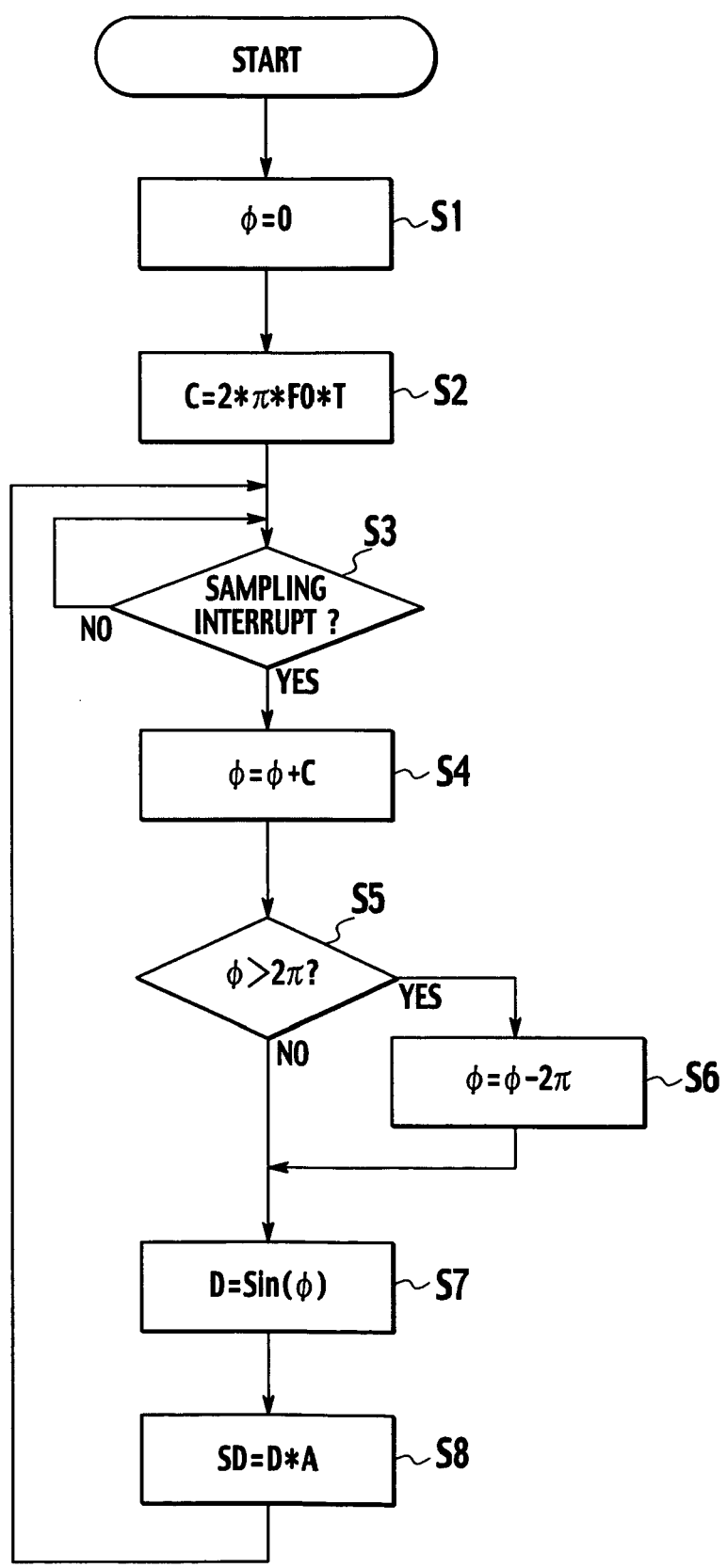
Figure 8:
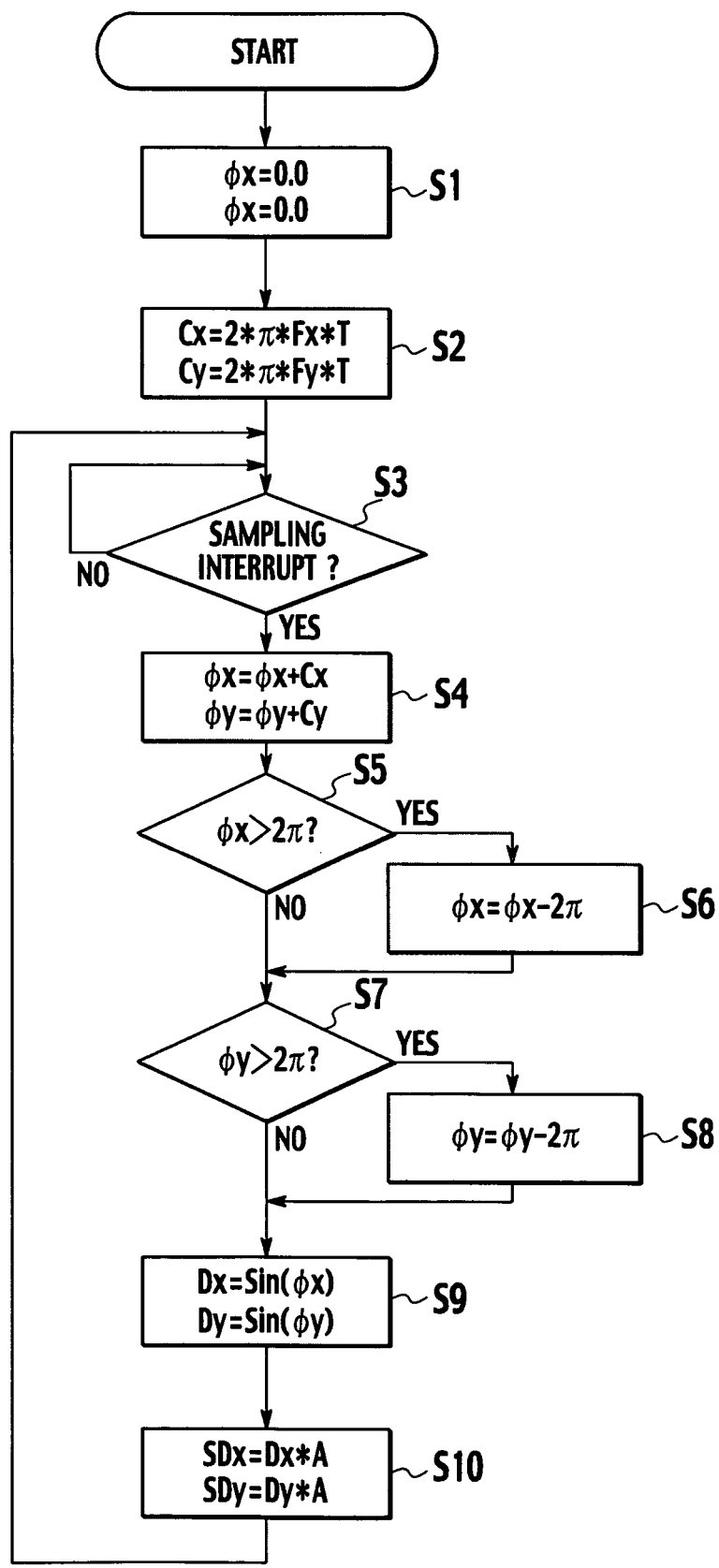
Figure 14:
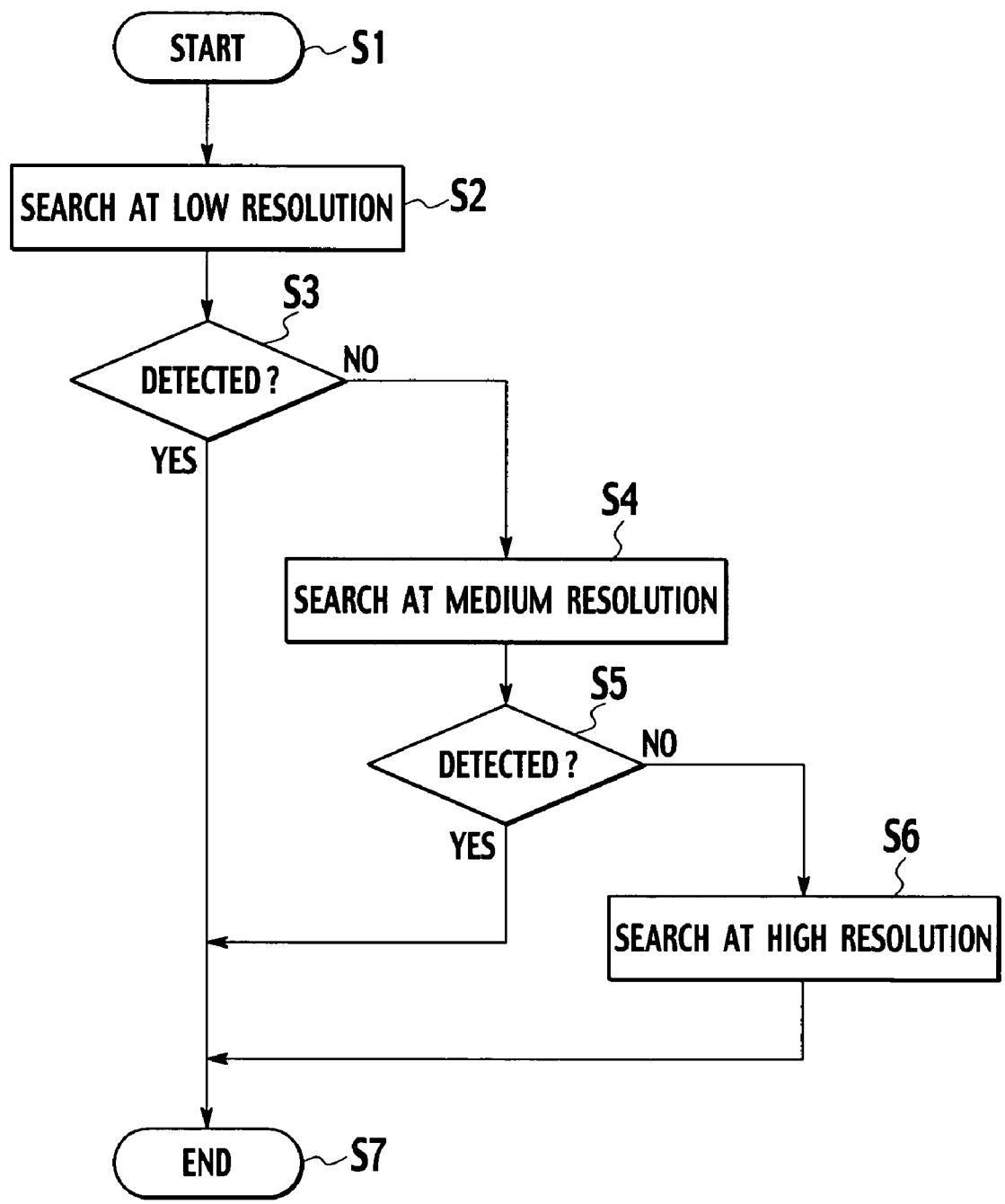
Figure 15:
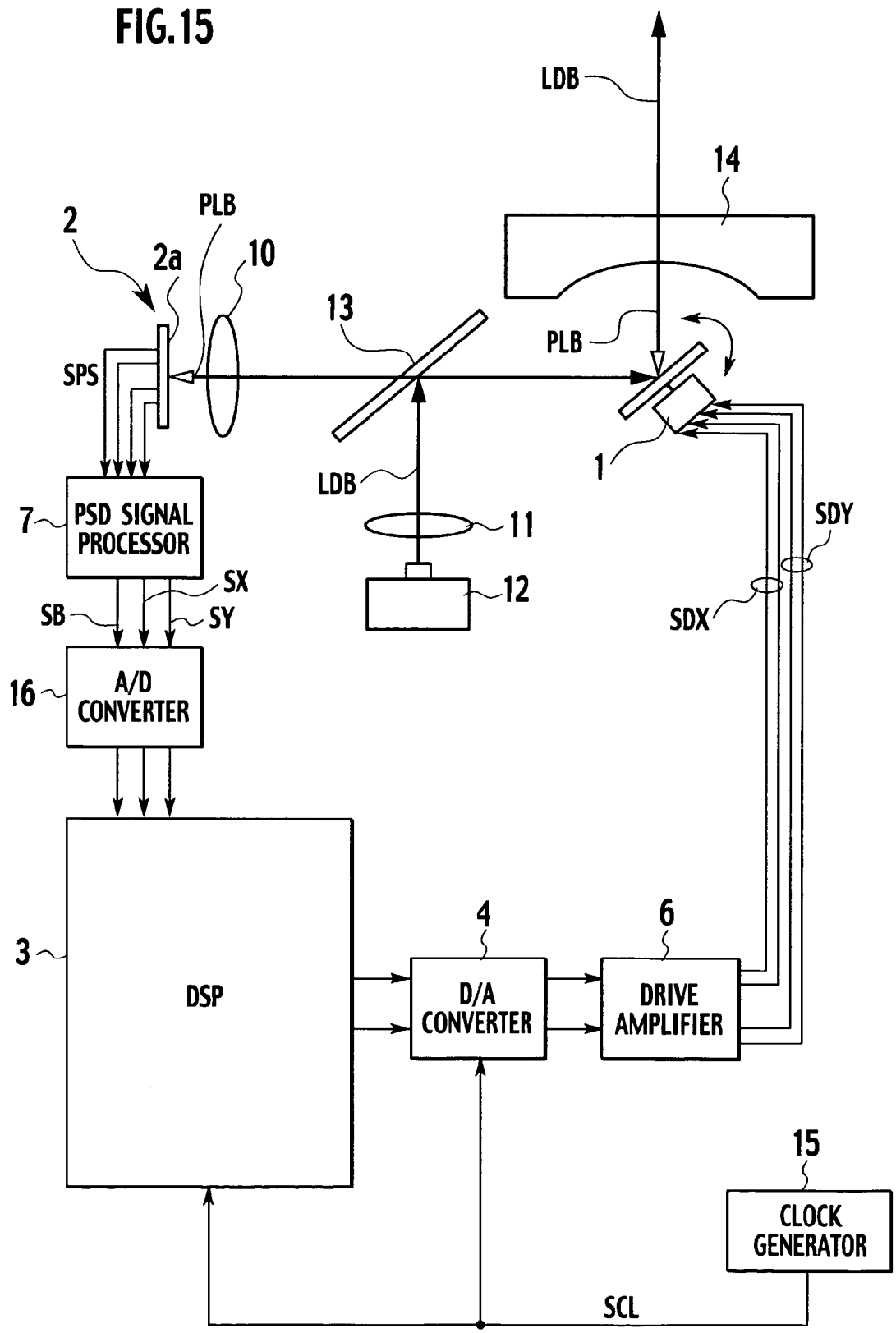
Figure 16:
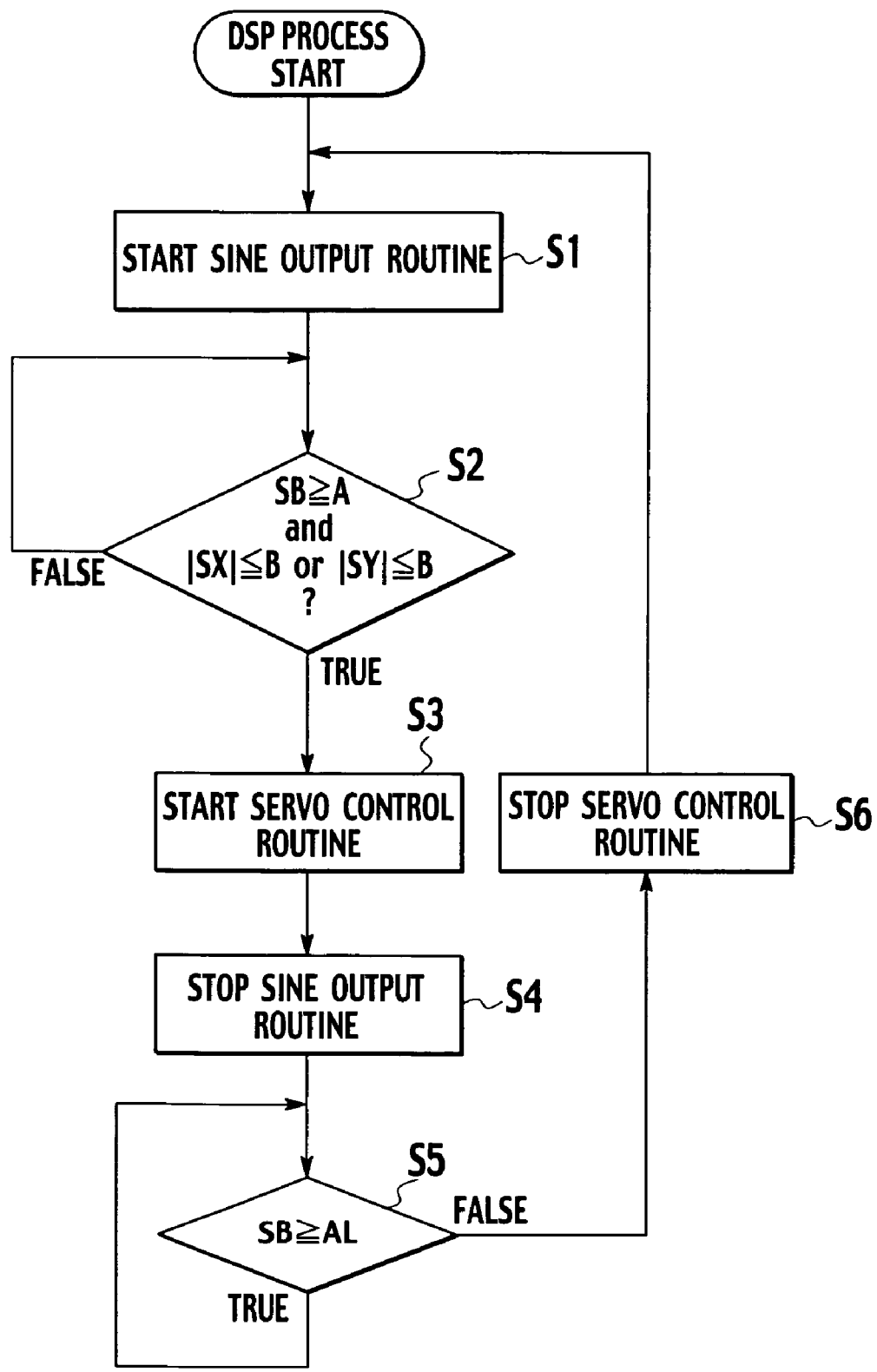

Having thus described the invention in general terms, reference will now be made to the accompanying drawings, which are not necessarily drawn to scale, and wherein:

FIG. 1 is a block diagram showing a light detecting apparatus according to a first embodiment of the present invention;

FIG. 2 is a plan view showing a two-axis deflection mirror of the light detecting apparatus;

FIG. 3 is an exploded perspective view showing the two-axis deflection mirror of the light detecting apparatus;

FIG. 4 is a front view showing a two-dimensional position sensitive detector (PSD) of the light detecting apparatus;

FIG. 5 is a block diagram showing the light detecting apparatus with the optical axis of a transmission light beam greatly deviating from the optical axis of a pilot light beam;

FIG. 6 is a block diagram showing a digital signal processor (DSP) for calculating a sine wave in the light detecting apparatus;

FIG. 7 is a flowchart showing the operation of calculating a sine wave conducted by the DSP;

FIG. 8 is a flowchart showing an operation of the DSP of generating two sine-wave signals having different frequencies;

FIGS. 9A to 9F show graphs of loci drawn in one second by the two-axis deflection mirror of the light detecting apparatus at a frequency of 50 Hz applied to an X-axis;

FIGS. 10A to 10C show graphs of loci drawn by the two-axis deflection mirror with frequencies applied to the X- and Y-axes involving errors;

FIGS. 11A to 11C show waveforms generated in a search operation by a PSD signal processor and a servo error signal level detector of the light detecting apparatus;

FIG. 12A and 12B show graphs of loci drawn by the two-axis deflection mirror of the light detecting apparatus with triangle waves serving as search control signals;

FIG. 13 is a flowchart showing a first example of a DSP operation in a light detecting apparatus according to a second embodiment of the present invention;

FIG. 14 is a flowchart showing a second example of a DSP operation in the light detecting apparatus according to the second embodiment;

FIG. 15 is a block diagram showing a light detecting apparatus according to a third embodiment of the present invention; and FIG. 16 is a flowchart showing a DSP operation in the light detecting apparatus according to the third embodiment.

DETAILED DESCRIPTION OF THE INVENTION

The present invention now will be described more fully hereinafter with reference to the accompanying drawings, in which preferred embodiments of the inventions are shown. This invention may, however, be embodied in many different forms and should not be construed as limited to the embodiments set forth herein; rather, these embodiments are provided so that this disclosure will be thorough and complete, and will fully covey the scope of the invention to those skilled in the art. Like numbers refer to like elements throughout.

A light detecting apparatus according to the present invention is used for, for example, a light receiving/emitting module for optical wireless communication, to find an orientation of a light emitting element and make the optical axis of a photodetector always follow the optical axis of the light emitting element. A light detecting apparatus according to an embodiment of the present invention is installed on a transmission side of optical wireless communication and adjusts the optical axis of a light emitting element on the transmission side according to a pilot light beam from a pilot light beam emitter installed on a reception side, to realize stable communication.

Structure of Light Detecting Apparatus

FIG. 1 is a block diagram showing a light detecting apparatus according to a first embodiment of the present invention.

In FIG. 1, the light detecting apparatus has a two-axis deflection mirror 1 serving as a two-axis deflector to deflect an incident light beam in a direction defined by two axes. The two-axis deflection mirror 1 reflects an incident light beam, and the reflected light beam is made incident to a two-dimensional position sensitive detector (hereinafter referred to as 2D PSD) 2 serving as a two-dimensional position detector that two-dimensionally detects an incident position of the reflected light beam.

The light detecting apparatus receives a pilot light beam (PLB) from a pilot light emitting element installed on a reception side. The pilot light beam is made incident to the two-axis deflection mirror 1 through a fish-eye lens (concave lens) 14. The fish-eye lens 14 is arranged to widen incoming and outgoing angles of light beams for the two-axis deflection mirror 1. The pilot light beam made incident to the two-axis deflection mirror 1 is reflected thereby. The reflected beam is transmitted through a beam splitter 13 and a PSD condensing lens 10 and is made incident to a photo-detecting face 2a of the 2D PSD 2. The PSD condensing lens 10 condenses the pilot light beam onto the photo-detecting face 2a.

The light detecting apparatus also includes a signal transmitting LD (laser diode) light emitting element 12. The light emitting element 12 emits a transmission light beam (LDB) modulated according to transmission data. The transmission light beam from the light emitting element 12 is transmitted through a collimator lens 11 to form a parallel light beam, which is reflected and deflected by the beam splitter 13 and is made incident to the two-axis deflection mirror 1. The transmission light beam made incident to the two-axis deflection mirror 1 is reflected thereby, is transmitted through the fish-eye lens 14, and is emitted toward a device on the reception side having the pilot light emitting element for emitting the pilot light beam.

An optical system in the light detecting apparatus is adjusted so that, when the pilot light beam is made incident to the center of the photo-detecting face 2a of the 2D PSD 2, the transmission light beam and pilot light beam are coaxial with each other. Namely, in the optical system, the center of the photo-detecting face 2a of the 2D PSD 2 and a light emitting point of the light emitting element 12 are conjugate relative to a reflecting face of the beam splitter 13. When the transmission light beam and pilot light beam are coaxial with each other, the transmission light beam can correctly be made incident to a photodetector of the device on the reception side.

FIG. 2 is a plan view showing a structure of the two-axis deflection mirror 1.

In FIGS. 2 and 3, the two-axis deflection mirror 1 has a base 1a made of, for example, polyimide. The base 1a has two circular apertures 1b and 1c formed by, for example, pattern etching. Outer and inner sides of the outer aperture 1b are connected to each other with two narrow Y-axis beams 1d. Outer and inner sides of the inner aperture 1c are connected to each other with two narrow X-axis beams 1e. The Y-axis beams 1d are separated from each other by 180° around the center of a circle defined by the aperture 1b. The X-axis beams 1e are separated from each other by 180° around the center of a circle defined by the aperture 1c. The Y-axis beams 1d and X-axis beams 1e are separated from each other by 90° around the center of the above-mentioned circles. Accordingly, a disk inside the inner aperture 1c can incline in an X-axis direction indicated with an arrow mark X in FIG. 2 by twisting the X-axis beams 1e. Also, the disk can incline in a Y-axis direction indicated with an arrow mark Y in FIG. 2 by twisting the Y-axis beams 1d.

In this way, the disk inside the inner aperture 1c can incline in the X- and Y-axis directions. The disk forms a mirror reflector 1f. The surface of the mirror reflector 1f is a mirror face (reflection face). A ring between the inner aperture 1c and the outer aperture 1b is a gimbal 1g for supporting the X-axis beams 1e.

FIG. 3 is an exploded perspective view showing a structure of the two-axis deflection mirror 1.

Behind the base 1a, there are an X-axis driving magnetic core 1i and a Y-axis driving magnetic core 1j. Each of the magnetic cores 1i and 1j has a partly broken annular shape (C-shape). Opposite to the broken part, the X-axis driving magnetic core 1i is wound with a coil 1k, and the Y-axis driving magnetic core 1j is wound with a coil 1l. The broken part forms a magnetic gap 1m. The magnetic gap 1m of each of the magnetic cores 1i and 1j is arranged to form a magnetic field therein when power is supplied to the coil 1k or 1l. The magnetic fields formed in the magnetic gaps 1m of the magnetic cores 1i and 1j are orthogonal to each other.

The bottom face of the mirror reflector 1f is provided with a protruding permanent magnet pin 1h as shown in FIG. 3. The permanent magnet pin 1h is substantially perpendicular to the mirror reflector 1f. A front part of the permanent magnet pin 1h is inserted in the magnetic gaps 1m of the X- and Y-axis driving magnetic cores 1i and 1j. The magnetic cores 1i and 1j and base 1a are positioned relative to each other so that the front part of the permanent magnet pin 1h is positioned substantially at the center of the magnetic gaps 1m.

In the two-axis deflection mirror 1 having the above-mentioned structure, the front part of the permanent magnet pin 1h moves in response to the strength and direction (polarity) of each magnetic field formed in the magnetic gaps 1m of the X- and Y-axis driving magnetic cores 1i and 1j, to incline the mirror reflector 1f in a direction defined by the X- and Y-axes.

FIG. 4 is a front view showing a structure of the 2D PSD 2.

In the light detecting apparatus, the 2D PSD 2 receives a light beam from the two-axis deflection mirror 1, and as shown in FIG. 4, two-dimensionally detects an incident position of the received light beam. The 2D PSD 2 is a standard device used in optical position measurement. The 2D PSD 2 has the photo-detecting face (position detector) 2a to receive a light beam 2b. The PSD 2 has four output terminals 2c, 2d, 2e, and 2f to output four PSD output signals representative of an incident position of the light beam 2b on the photo-detecting face 2a. Namely, levels of the PSD output signals express the incident position of the light beam 2b on the photo-detecting face 2a.

Returning to FIG. 1, the light detecting apparatus also has a DSP (digital signal processor) 3 serving as a search controller, and a D/A converter 4. The DSP 3 outputs X-axis numerical data SAX and Y-axis numerical data SAY, and the D/A converter 4 converts these pieces of data into analog data pieces. The DSP 3 is capable of conducting arithmetic operations for providing discrete-time signals during a predetermined sampling period. The DSP 3 generates a search control signal to control the two-axis deflection mirror 1.

The DSP 3 generates, as the search control signal, two periodic signals of different frequencies, i.e., the X-axis numerical data SAX and Y-axis numerical data SAY. These pieces of data SAX and SAY are converted by the D/A converter 4 into analog data, i.e., an X-axis search control signal SSX and a Y-axis search control signal SSY, which are passed through a signal switching unit 5 to a drive amplifier 6. The drive amplifier 6 amplifies the X- and Y-axis search control signals SSX and SSY and provides an X-axis drive current SDX and a Y-axis drive current SDY, which are applied to the coils 1k and 1l of the X- and Y-axis driving magnetic cores 1i and 1j, respectively, to drive the two-axis deflection mirror 1.

The DSP 3 and D/A converter 4 operate in response to a clock signal supplied from a clock generator 15. Namely, the clock signal from the clock generator 15 is used to form a sampling signal SCL to synchronize an interrupt operation of the DSP 3 with the conversion timing of the D/A converter 4. It is preferable that a period of the sampling signal SCL is sufficiently higher than the frequencies of the periodic signals generated by the DSP 3.

The mirror reflector 1f of the two-axis deflection mirror 1 is inclined in the X-axis direction according to the X-axis drive current SDX supplied to the coil 1k of the X-axis driving magnetic core 1i and in the Y-axis direction according to the Y-axis drive current SDY supplied to the coil 1l of the Y-axis driving magnetic core 1j. The inclination in the X-axis direction and the inclination in the Y-axis direction are made independently of each other.

The X- and Y-axis numerical data pieces SAX and SAY are periodic signals having different frequencies to control an inclining direction of the mirror reflector 1f of the two-axis deflection mirror 1 along the X- and Y-axes.

When the periodic signals are sine waves and when a ratio of the frequencies of the periodic signals is a rational number, the inclining direction of the mirror reflector 1f draws Lissajous figures. Namely, a light beam is made incident to the two-axis deflection mirror 1 and is reflected by the mirror reflector 1f of the two-axis deflection mirror 1 toward the 2D PSD 2. At this time, if the two-axis deflection mirror 1 is driven according to the periodic signals, the reflected light beam from the two-axis deflection mirror 1 draws a Lissajous figure on the 2D PSD 2.

A Lissajous figure is a figure drawn by a point that moves on a plane in a harmonic motion along two orthogonal axes with a ratio of frequencies being a rational number (a number expressible with a quotient of two integers).

As mentioned above, the two-axis deflection mirror 1 is controlled according to the search control signals generated by the DSP 3, and the light detecting apparatus detects an incident position of a light beam on the 2D PSD 2 and finds an orientation of the light emitting element that emits the pilot light beam to the two-axis deflection mirror 1.

The four PSD output signals from the 2D PSD 2 are supplied to a PSD signal processor 7 serving as a servo error signal generator. According to the outputs from the two-dimensional PSD 2, the PSD signal processor 7 generates servo error signals, i.e., an X-axis position signal SX and a Y-axis position signal SY representative of an incident position of a light beam on the 2D PSD 2. The position signals SX and SY are sent to a servo controller 8.

The X- and Y-axis position signals SX and SY generated by the PSD signal processor 7 have levels proportional to X- and Y-axis positions, respectively, with a coordinate center O shown in FIG. 4 serving as an origin (zero). The levels of the X- and Y-axis position signals SX and SY are proportional to displacements from the coordinate center O, and therefore, the signals SX and SY are called servo error signals.

As shown in FIG. 1, the servo controller 8 controls the two-axis deflection mirror 1 according to the X- and Y-axis position signals SX and SY so that a light beam may be made incident to a predetermined incident position on the 2D PSD 2.

Namely, the servo controller 8 generates X- and Y-axis servo control signals SCX and SCY according to the X- and Y-axis position signals SX and SY from the PSD signal processor 7 and sends the signals SCX and SCY through the signal switching unit 5 and drive amplifier 6 to the two-axis deflection mirror 1, thereby conducting closed loop control on the two-axis deflection mirror 1. The closed loop control is to make a light beam incident to the coordinate center O of the 2D PSD 2.

The servo controller 8 includes a phase compensator for compensating a dynamic characteristic of the two-axis deflection mirror 1.

The PSD signal processor 7 has a function of generating an incident light intensity signal SB representative of the intensity of an incident light beam. The incident light intensity signal SB is sent to a servo error signal level detector 9.

The servo error signal level detector 9 is made of comparators and logic circuits. According to the incident light intensity signal SB from the PSD signal processor 7, the servo error signal level detector 9 generates a switching control signal SE, which is sent to the signal switching unit 5. When the incident light intensity signal SB indicates a predetermined level, the servo error signal level detector 9 provides a switching control signal SE to change the state of the signal switching unit 5.

The signal switching unit 5 switches signals to be input to the two-axis deflection mirror 1 between the X- and Y-axis servo control signals SCX and SCY supplied from the servo controller 8 and the X- and Y-axis search control signals SSX and SSY supplied from the DSP 3.

Namely, according to the switching control signal SE generated by the servo error signal level detector 9 in response to a level of the incident light intensity signal SB generated by the PSD signal processor 7, the signal switching unit 5 switches the search operation that supplies the X- and Y-axis search control signals SSX and SSY from the DSP 3 to the two-axis deflection mirror 1 through the drive amplifier 6 and the servo operation that supplies the X- and Y-axis servo control signals SCX and SCY from the servo controller 8 to the two-axis deflection mirror 1 through the drive amplifier 6 from one to another.

Operation of Light Detecting Apparatus

Operation of the light detecting apparatus will be explained.

In the servo operation, the light detecting apparatus of FIG. 1 controls the two-axis deflection mirror 1 so that the pilot light beam from the reception side is made incident to the coordinate center O of the photo-detecting face 2a of the 2D PSD 2. As a result, the optical axis of a transmission light beam agrees with the optical axis of the pilot light beam, to realize stable signal transmission.

If the pilot light beam is made incident to a photosensitive area of the photo-detecting face 2a of the 2D PSD 2, the servo controller 8 controls the two-axis deflection mirror 1 so that the pilot light beam is made incident to the coordinate center O of the photo-detecting face 2a.

FIG. 5 is a block diagram showing the light detecting apparatus of the first embodiment with the optical axis of a transmission light beam greatly deviating from the optical axis of the pilot light beam.

When the optical axis of a transmission light beam greatly deviates from the optical axis of the pilot light beam as shown in FIG. 5, the pilot light beam is out of the photo-detecting face 2a of the 2D PSD 2, and therefore, the optical axis adjustment by the servo controller 8 is inoperable. This condition will occur at the start of signal communication after the installation of transmitter-receivers or when the transmitter-receivers are moved due to some reason.

When the optical axis of a transmission light beam greatly deviates from the optical axis of the pilot light beam, the light detecting apparatus of the first embodiment makes the DSP 3 carry out the search operation to drive the two-axis deflection mirror 1 for a wide range of angles to find an orientation of the pilot light beam.

If the pilot light beam enters the photosensitive area of the photo-detecting face 2a during the search operation, the servo error signal level detector 9 detects it from a level of the incident beam intensity signal SB, and the signal switching unit 5 switches the search operation to the servo operation (closed loop control operation) carried out by the servo controller 8 to adjust the optical axis of the pilot light beam.

During the search operation, the DSP 3 carries out a sine calculation based on a variable φ that is constantly incremented according to a sampling period and continuously supplies a calculation result to the D/A converter 4 that operates in synchronization with the sampling period and generates a sine-wave signal.

Operation of an internal program of the DSP 3 of generating a sine-wave signal will be explained.

FIG. 6 is a block diagram showing a structure of the DSP 3 to calculate a sine wave.

In FIG. 6, an internal operation function of the DSP 3 is expressed as a discrete signal process. In the DSP 3, a sine calculation block 20 calculates sin(φ) based on an input variable φ. This calculation may be achieved by using a sine function provided by a compiler, or by using an approximating polynomial to balance an operation accuracy and an operation speed.

A sampling delay unit 21 has a function of holding a one-sampling-period-before value of the input variable φ. An adder 22 adds a present value of the variable φ to the preceding value of the variable φ stored in the sampling delay unit 21 and transfers the sum to the sine calculation block 20 and sampling delay unit 21.

A constant C to determine the frequency of a sine wave in the DSP 3 is expressed as follows:

$$C = 2 \cdot \pi \cdot F0 \cdot T \qquad (1)$$

(F0 is a sine wave frequency and T is a sampling period.)

The parts other than the sine calculation block 20 execute the following operation:

$$\phi[n] = \phi[n-1] + C \qquad (2)$$

(n is a present number of sampling times.)

The expression (2) indicates that φ[n] is incremented by the constant rate C in each sampling period. In this way, the sine calculation block 20 calculates sin(φ[n]) in each sampling period. Namely, the calculated sine value changes every sampling period. The value φ[n] is successively incremented every sampling period, and therefore, a calculation divergence must be prevented by carrying out the following operation when a condition of "φ[n]>2π" is met:

$$\phi[n] = \phi[n-1] - 2\pi \qquad (3)$$

FIG. 7 is a flowchart showing the sine wave calculation process carried out by the DSP 3.

With reference to the flowchart of FIG. 7, a sine wave calculation program executed by the DSP 3 will be explained.

Step S1 initializes the input variable φ(φ=0) and advances to step S2.

Step S2 calculates the constant C according to the expression (1) and advances to step S3.

Step S3 waits for a sampling (interrupt) signal from the clock generator 15, and if there is an interrupt, advances to step S4.

Step S4 adds the constant C to the input variable φ to increment the input variable φ at the constant rate and advances to step S5.

Step S5 checks to see if the input variable φ is greater than 2π. If the input variable φ is greater than 2π, step S6 is carried out, and if not, step S7 is carried out.

Step S6 prevents divergence of the input variable φ by subtracting 2π from the input variable φ and advances to step S7.

Step S7 calculates sin(φ) as D and advances to step S8.

Step S8 multiplies D by A to provide SD. Here, D changes between −1 and 1, and A is a constant corresponding to the number of bits of the D/A converter 4. Thereafter, the flow returns to step S3.

To generate two sine-wave signals having different frequencies, the DSP 3 carries out the sine calculation of the expression (1) with the use of two different constants C.

FIG. 8 is a flowchart showing a process carried out by the DSP 3 to generate two sine-wave signals having different frequencies.

In FIG. 8, the X- and Y-axes of the two-axis deflection mirror 1 are allocated with frequencies Fx and Fy, respectively. To calculate the X-axis numerical data SAX, a constant Cx is provided for the expression (1). To calculate the Y-axis numerical data SAY, a constant Cy is provided for the expression (1).

Step S1 initializes input variables φx and φy (φx=0, φy=0) and advances to step S2.

Step S2 calculates the constants Cx and Cy according to the expression (1) and advances to step S3.

Step S3 waits for a sampling (interrupt) signal from the clock generator 15, and if there is an interrupt, advances to step S4.

Step S4 adds the constant Cx to the input variable φx and the constant Cy to the input variable φy, thereby incrementing the input variables φx and φy at constant rates.

Step S5 checks to see if φx is greater than 2π. If the input variable φx is greater than 2π, step S6 is carried out, and if not, step S7 is carried out.

Step S6 prevents divergence of the input variable φx by subtracting 2π from φx and advances to step S7.

Step S7 checks to see if φy is greater than 2π. If the input variable φy is greater than 2π, step S8 is carried out, and if not, step S9 is carried out.

Step S8 prevents divergence of the input variable φy by subtracting 2π from φy and advances to step S9.

Step S9 calculates sin(φx) as Dx and sin(φy) as Dy and advances to step S10.

Step S10 multiplies each of Dx and Dy by a constant A to provide SDx and SDy and returns to step S3. Here, each of Dx and Dy changes between −1 and 1, and the constant A corresponds to the number of bits of the D/A converter 4.

SDx becomes the X-axis numerical data SAX and SDy becomes the Y-axis numerical data SAY.

The X-axis numerical data SAX and Y-axis numerical data SAY are converted by the D/A converter 4 into analog data pieces, which are amplified by the drive amplifier 6 and are supplied to the coils 1k and 1l of the X- and Y-axis driving magnetic cores 1i and 1j, to sine-wave-drive the axes of the two-axis deflection mirror 1.

When the X- and Y-axes of the two-axis deflection mirror 1 are driven at different frequencies, a phase difference between the sine waves for the X- and Y-axes changes step by step. Namely, a light beam from the two-axis deflection mirror 1 toward the 2D PSD 2 draws a locus on the PSD 2 according to the frequencies. By following the locus, the search operation is carried out to find an incident position of the light beam on the PSD 2.

The search operation using the two-axis deflection mirror 1 will be explained in connection with loci drawn by a transmission light beam emitted from the light emitting element 12 and deflected by the two-axis deflection mirror 1. The loci drawn by the transmission light beam coincide with loci of inclination of the two-axis deflection mirror 1.

The frequencies Fx and Fy applied to the X-axis and Y-axis of the two-axis deflection mirror 1 have a ratio m which is expressed as follows:

$$m = Fy/Fx \quad (4)$$

FIGS. 9A to 9F show graphs of loci drawn by the two-axis deflection mirror 1 in one second when the frequency Fx for the X-axis is 50 Hz.

Figure 9A:
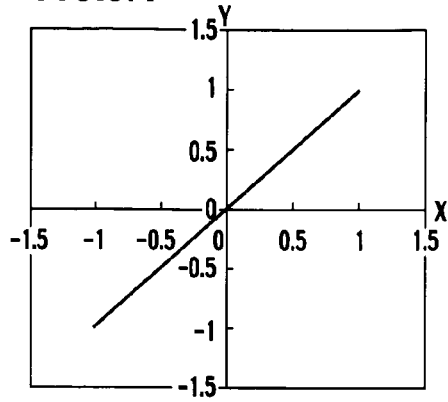

FIG. 9A shows a search locus when the frequency ratio m is 1 (i.e., Fx=Fy). In this case, a phase difference between X- and Y-axis sine waves is zero, and the locus becomes a straight line to conduct no meaningful search operation.

Figure 9B:
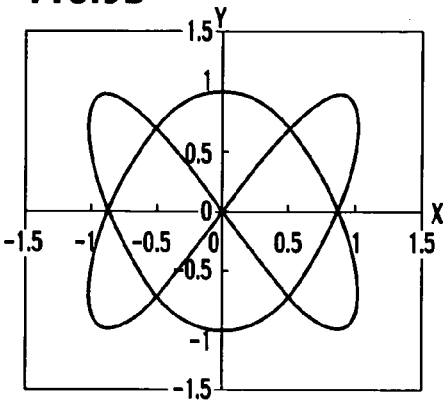

FIG. 9B shows a search locus with the frequency ratio m=1.50 (2:3 in integer ratio). In this case, the search locus converges in two periods of sine waves to repeat the same locus at intervals of 40 msec. The locus crosses the Y-axis four times and the X-axis six times to realize a very low resolution.

If the ratio of the frequency Fx for the X-axis to the frequency Fy for the Y-axis is a set of disjoint integers (x:y), a locus based on the frequencies crosses the X-axis 2x times and the Y-axis 2y times. Here, a resolution of this locus in searching for an incident position of a light beam is defined as a product of the numbers of times of crossing the X- and Y-axes, i.e., 4xy. For example, the resolution of the locus shown in FIG. 9B is 24.

Figure 9C:
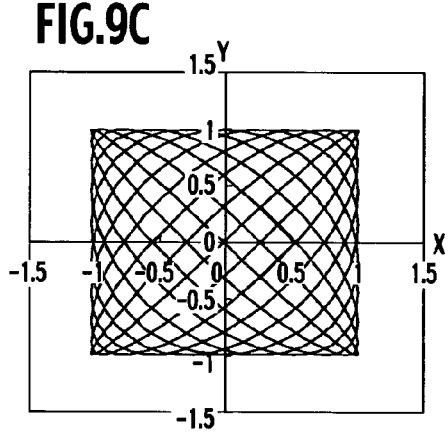

FIG. 9C shows a search locus with the frequency ratio m=1.10 (an integer ratio of 10:11). In this case, the search locus converges in 10 sine-wave periods. Namely, the locus repeats every 200 msec. The locus crosses the Y-axis 20 times and the X-axis 22 times to improve the resolution higher than FIG. 9B. The search operation of FIG. 9C is carried out in all directions and the resolution thereof is 440.

Figure 9D:
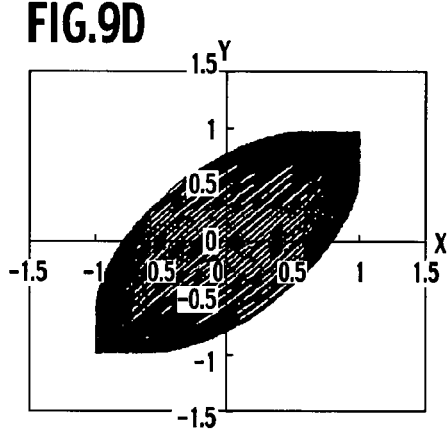

FIG. 9D shows a search locus with the frequency ratio m=1.003 (an integer ratio of 1000:1003). In this case, the locus does not converge within one second and takes 20 seconds to converge after searching all directions. Accordingly, this locus is disadvantageous in terms of searching speed and provides a resolution of 4012000.

Figure 9E:
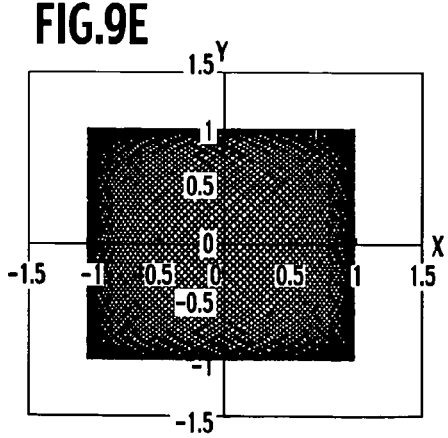

FIG. 9E shows a search locus with the frequency ratio m=1.18 (an integer ratio of 50:59). In this case, the search locus converges in 50 sine-wave periods and repeats every second. The locus crosses the Y-axis 100 times and the X-axis 118 times to realize high-resolution searching in all directions. The resolution is 11800.

Figure 9F:
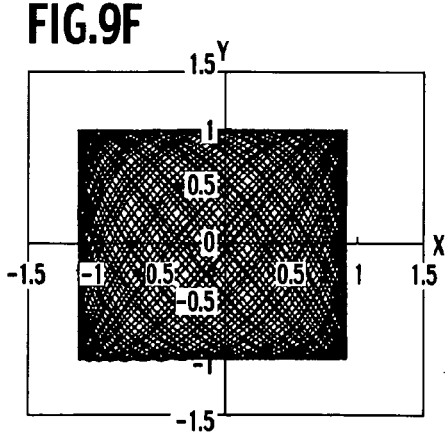

FIG. 9F is a search locus with the frequency ratio m=√2 (a non-integer ratio, an irrational number). In this case, the search locus never converges and substantially realizes an infinite resolution as time passes.

To increase search speed, the frequencies Fx and Fy of sine waves must be increased. It is impossible, however, to unreasonably increase the frequencies because of mechanical vibration of the two-axis deflection mirror 1. Reducing the frequency ratio m is preferable to realize a stabilized operation.

Even with low frequencies, a preferable result is obtainable depending on the frequency ratio m. For example, the frequency ratio m=1.18 of the FIG. 9E can perform an all-direction search operation at a high resolution within a short time.

Employing a non-integer frequency ratio like the FIG. 9F can realize a substantially infinite resolution as time passes, to carry out a reliable search for a pilot light beam having a very small diameter.

According to an embodiment of the present invention, the frequencies and frequency ratio m of sine waves can be optimized to achieve a target search time and a target detection resolution.

The frequency of each sine wave is preferably within the range of 10 to 1000 Hz, and the frequency ratio m of sine waves is preferably within the range of 1 to 1.5.

FIGS. 10A to 10C shows graphs of loci with a ratio of X- and Y-axis frequencies involving an error.

If the frequency ratio m is 1.18 as shown in FIG. 9E and if Fx is 50 Hz, then Fy is 59 Hz. In this case, if Fy involves an error of ±1 Hz, then the frequency ratio m becomes 25:29 as shown in FIG. 10B, or 5:6 as shown in the FIG. 10C, to draw quite different loci. FIG. 10A shows a locus without error.

Accordingly, to achieve an anticipated operation, the frequencies must be controlled to an error of 0.1 Hz or smaller.

The light detecting apparatus according to the first embodiment employs two sine-wave signals generated by the DSP 3, and therefore, can precisely control the frequency ratio m of the sine-wave signals. By controlling the inclination of each axis of the two-axis deflection mirror 1 according to such precision sine-wave signals, the embodiment can perform the search operation based on a stabilized locus.

Employing an analog circuit instead of the DSP 3 to generate sine-wave signals is impossible to precisely control the sine-wave signals. In addition, the frequencies and frequency ratio of the signals generated by the analog circuit are easily affected by, for example, temperature drift, to destabilize the search operation.

FIGS. 11A to 11C show output signal waveforms provided by the PSD signal processor 7 and servo error signal level detector 9 during the search operation explained above.

During the search operation, if the pilot light beam is made incident to the photosensitive area of the photo-detecting face 2a of the 2D PSD 2, a level of the incident light intensity signal SB from the PSD signal processor 7 increases as shown in FIG. 11B. At the same time, the servo error signals (X-axis position signal SX and Y-axis position signal SY) provided by the PSD signal processor 7 to represent a spot position of the pilot light beam change as shown in FIG. 11A.

When the incident light intensity signal SB exceeds a predetermined level A and when the level of one of the X- and Y-axis position signals SX and SY becomes zero, the servo error signal level detector 9 changes the switching control signal SE as shown in FIG. 11C, to control the signal switching unit 5 so that the search operation is switched to the servo operation (closed loop control operation).

During the servo operation, the optical axis of the two-axis deflection mirror 1 is adjusted to follow the pilot light beam as long as the pilot light beam is made incident to the photosensitive area of the photo-detecting face 2a of the 2D PSD 2.

The above-mentioned signals to control the search operation may be periodic triangle-wave signals containing high-frequency components, instead of sine-wave signals. In this case, however, there is a risk of generating resonance and destabilizing the search operation depending on the vibration characteristic of the two-axis deflection mirror 1. The risk becomes greater when the two-axis deflection mirror 1 is driven for a wide range of angles at high speed.

Accordingly, it is preferable that the signals to control the search operation are sine-wave signals containing least high-frequency components.

Employing triangle waves, however, is possible.

FIGS. 12A and 12B show graphs of loci drawn by the two-axis deflection mirror 1 with triangle waves.

A search operation with triangle waves applied to the X- and Y-axes of the two-axis deflection mirror 1 draws grating loci as shown in FIG. 12A. Namely, the loci are made of straight lines parallel to the X- and Y-axes and straight lines oblique to the X- and Y-axes.

A search operation with a triangle wave applied to the X-axis of the two-axis deflection mirror 1 and a sine wave to the Y-axis thereof draws loci asymmetrical to the X- and Y-axes as shown in FIG. 12B. FIGS. 12A and 12B are drawn with the frequency ratio m=1.10 like FIG. 9C.

In this way, the triangle-wave periodic signals contain many high-frequency components, and therefore, it is necessary to use, for example, low-pass filters to suppress abnormal vibration of the two-axis deflection mirror 1.

SECOND EMBODIMENT

FIG. 13 is a flowchart showing a first example of operation carried out by a DSP 3 of a light detecting apparatus according to a second embodiment of the present invention.

The structure of the light detecting apparatus according to the second embodiment is basically the same as that of the first embodiment shown in FIG. 1.

According to the second embodiment shown in FIG. 13, the DSP 3 starts a search operation in step S1, and in step S2, sets a first resolution that is relatively low, for example, a resolution of 440 with the frequency ratio m=1.10 shown in FIG. 9C.

Thereafter, step S3 checks to see if a pilot light beam is made incident to a photo-detecting face 2a of a two-dimensional position sensitive detector (2D PSD) 2 within a predetermined time. If the pilot light beam is made incident to the photo-detecting face 2a of the 2D PSD 2 within the predetermined time, step S5 is carried out to terminate the search operation, and if not, step S4 is carried out.

In step S4, the DSP 3 changes the first resolution to a higher second resolution, for example, a resolution of 4012000 with the frequency ratio m=1.003 shown in FIG. 9D. With the second resolution, the search operation is continued until the pilot light beam is detected on the photo-detecting face 2a of the 2D PSD 2. Then, step S5 is carried out to terminate the search operation.

In this way, the search operation is started at a relatively low resolution. If the pilot light beam is detected on the photo-detecting face 2a of the 2D PSD 2 at this resolution, the search operation quickly completes. If the pilot light beam is not detected in the search operation at the relatively low resolution, the search operation is continued at a higher resolution to surely detect the pilot light beam.

The example mentioned above increases the resolution in step S4 higher than the resolution set in step S2. Instead, a phase may be changed at the same resolution. This technique displaces a locus to provide the same effect as increasing the resolution. The same is applicable to the below-mentioned example.

FIG. 14 is a flowchart showing a second example of operation of the DSP 3 of the light detecting apparatus according to the second embodiment.

In FIG. 14, the DSP 3 successively increases the resolution and repeats the search operation.

In step S1, the DSP 3 starts a search operation, and in step S2, sets a relatively low first resolution, for example, a resolution of 440 with the frequency ratio m=1.10 shown in FIG. 9C.

Thereafter, step S3 checks to see if a pilot light beam is detected on the photo-detecting face 2a of the 2D PSD 2 within a predetermined time. If the pilot light beam is detected on the 2D PSD 2 within the predetermined time, step S7 is carried out to terminate the search operation, and if not, step S4 is carried out.

In step S4, the DSP3 sets a second resolution that is higher than the first resolution and carries out the search operation. For example, the second resolution is 11800 with the frequency ratio m=1.18 as shown in FIG. 9E.

Step S5 checks to see if the pilot light beam is detected on the photo-detecting face 2a of the 2D PSD 2 within a predetermined time. If the pilot light beam is made incident to the photo-detecting face 2a of the 2D PSD 2 within the predetermined time, step S7 is carried out to terminate the search operation, and if not, step S6 is carried out.

In step S6, the DSP 3 sets a third resolution higher than the second resolution. For example, the third resolution is 4012000 with the frequency ratio m=1.003 shown in FIG. 9D. With the third resolution, the search operation is carried out until the pilot light beam is detected on the photo-detecting face 2a, and then, step S7 is carried out to terminate the search operation.

Although the example of FIG. 14 shows the search operation to be carried out at the first to third resolutions, it is possible to repeat the search operation by gradually increasing the resolution to a fourth resolution, a fifth resolution, and the like.

In this way, the second embodiment starts the search operation with a relatively low resolution. If the pilot light beam is detected on the photo-detecting face 2a of the 2D PSD 2 with this resolution, the search operation quickly completes. If the pilot light beam is not detected with the relatively low resolution, the second embodiment continues the search operation by successively increasing the resolution to surely detect the pilot light beam.

THIRD EMBODIMENT

FIG. 15 is a block diagram showing a light detecting apparatus according to the third embodiment of the present invention.

The light detecting apparatus of the third embodiment shown in FIG. 15 employs a digital signal processor (DSP) 3 that integrates the DSP 3 serving as a search controller, servo controller 8, and switching unit 5 of the first embodiment shown in FIG. 1 into one.

An optical system of the light detecting apparatus of the third embodiment has the same structure as that of the first embodiment. Namely, a pilot light beam (PLB) from a pilot light beam emitting element on a reception side is transmitted through a fish-eye lens (concave lens) 14 and is made incident to a two-axis deflection mirror 1. The pilot light beam is reflected by the two-axis deflection mirror 1, is transmitted through a beam splitter 13 and a condensing lens 10, and is made incident to a photo-detecting face 2a of a two-dimensional position sensitive detector (2D PSD) 2.

A laser diode light emitting element 12 of the light detecting apparatus emits a transmission light beam (LDB) optically modulated by transmission data. The transmission light beam LDB is transmitted through a collimator lens 11, is reflected by the beam splitter 13 and two-axis deflection mirror 1, is passed through the fish-eye lens 14, and is emitted toward a device on the reception side.

In the optical system of the light detecting apparatus, the center of the photo-detecting face 2a of the 2D PSD 2 and a light emitting point of the light emitting element 12 are conjugate relative to a reflecting face of the beam splitter 13.

The structures of the two-axis deflection mirror 1 and 2D PSD 2 are the same as those of the first embodiment.

In the light detecting apparatus, the DSP 3 serves as a search controller, servo controller, and signal switching unit. Output data from the DSP 3 is converted by a D/A converter 4 into analog data.

In a search operation, the DSP 3 generates X-axis numerical data SAX and Y-axis numerical data SAY. The data pieces SAX and SAY are two periodic signals having different frequencies. These pieces of data SAX and SAY are converted by the D/A converter 4 into analog data, i.e., an X-axis search control signal SSX and a Y-axis search control signal SSY, which are passed to a drive amplifier 6. The drive amplifier 6 amplifies the X- and Y-axis search control signals SSX and SSY and provides an X-axis drive current SDX and a Y-axis drive current SDY to the two-axis deflection mirror 1.

The DSP 3 and D/A converter 4 operate in response to a clock signal supplied from a clock generator 15.

A mirror reflector of the two-axis deflection mirror 1 is inclined in an X-axis direction according to the X-axis drive current SDX and in a Y-axis direction according to the Y-axis drive current SDY. The inclining in the X-axis direction and the inclining in the Y-axis direction are made independently of each other.

The X- and Y-axis numerical data pieces SAX and SAY are periodic signals having different frequencies to control the inclining directions of the mirror reflector of the two-axis deflection mirror 1.

Four PSD output signals from the 2D PSD 2 are supplied to a PSD signal processor 7 serving as a servo error signal generator. According to the outputs from the two-dimensional PSD2, the PSD signal processor 7 generates servo error signals, i.e., an X-axis position signal SX and a Y-axis position signal SY representative of an incident position of a light beam on the 2D PSD 2. The position signals SX and SY are sent to the DSP 3 through an A/D converter 16.

The A/D converter 16 converts the X-axis position signal SX, the Y-axis position signal SY, and an incident light intensity signal SB from the PSD signal processor 7 into digital signals, which are supplied to the DSP 3.

The X- and Y-axis position signals SX and SY generated by the PSD signal processor 7 have levels proportional to X- and Y-axis positions of an incident light beam relative to a coordinate center O of the photo-detecting face 2a of the 2D PSD 2. The levels of the X- and Y-axis position signals SX and SY are proportional to displacements from the coordinate center O, and therefore, the signals SX and SY are called servo error signals.

In a servo operation, the DSP 3 controls the two-axis deflection mirror 1 according to the X- and Y-axis position signals SX and SY, to make a light beam incident to a predetermined position on the 2D PSD 2. Namely, the DSP 3 generates X- and Y-axis servo control signals SCX and SCY according to the X- and Y-axis position signals SX and SY and sends the signals SCX and SCY to the two-axis deflection mirror 1 through the D/A converter 4 and drive amplifier 6 to conduct closed loop control on the two-axis deflection mirror 1. The closed loop control makes a light beam incident to the coordinate center O of the 2D PSD 2.

The PSD signal processor 7 has a function of generating the incident light intensity signal SB representative of an incident light intensity corresponding to a level of a servo error signal. The PSD signal processor 7 provides the incident light intensity signal SB to the DSP 3.

The DSP 3 switches the search operation and servo operation from one to another according to a level represented with the incident light intensity signal SB from the PSD signal processor 7.

FIG. 16 is a flowchart showing operation of the DSP 3 of the light detecting apparatus according to the third embodiment.

A flow of a program executed by the DSP 3 will be explained with reference to FIG. 16.

Step S1 carries out the sine wave calculation shown in FIG. 8 and provides the D/A converter 4 with a calculation result to start a search operation.

Step S2 checks to see if numerical data represented with the input light intensity signal SB is equal to or greater than a predetermined value A and if any one of the absolute values of numerical data represented with the X- and Y-axis position signals SX and SY is equal to or smaller than a predetermined value B. If the answer is TRUE, step S3 is carried out, and if it is FALSE, step S2 is again carried out.

Step S3 starts a servo operation and advances to step S4. The servo operation digitally processes servo error signals, i.e., numerical data represented with the X- and Y-axis position signals SX and SY, to realize a filtering characteristic and conduct phase compensation. A result of the digital process is supplied to the D/A converter 4.

Step S4 terminates a sine wave output routine for the search operation and advances to step S5.

Step S5 monitors numerical data represented with the input light intensity signal SB. If a level of the input light intensity signal SB is equal to or greater than (TRUE) a predetermined value AL, step S5 is repeated. If the signal SB is below (FALSE) the predetermined value AL, step S6 is carried out.

Step S6 stops the servo operation and returns to step S1 to repeat the search operation.

The DSP 3 carries out these steps. If the optical axis of a transmission light beam disagrees with the optical axis of a pilot light beam, the search operation is started. After completing the search operation, i.e., after detecting the pilot light beam, the optical axis of the transmission light beam is adjusted to follow the direction of the pilot light beam.

The function of the DSP 3 is executable by a CPU of, for example, a microcomputer if the processing speed of the CPU allows it. The 2D PSD 2 is replaceable with a quadrant photodetector or a CMOS sensor.

As mentioned above, the two-axis deflector in the light detecting apparatus of this embodiment deflects a light beam toward the two-dimensional position detector. The search controller carries out the search operation to detect an incident position of a light beam on the two-dimensional position detector and find an orientation of a light emitting element that emits a light beam toward the two-axis deflector. Even if a deflection frequency of the two-axis deflector is low, the light detecting apparatus can perform the search operation at high speed for a wide range to surely and quickly find the orientation of the light emitting element.

The search controller can generate a search control signal made of two periodic signals such as sine-wave signals or triangle-wave signals through a DSP operation and can precisely control a frequency ratio of the two periodic signals. This stabilizes an incident position of a light beam on the two-dimensional position detector.

In the light detecting apparatus, the search controller repeats the search operation by gradually increasing a resolution until an incident position of a light beam is detected on the two-dimensional position detector. This results in efficiently and quickly find an orientation of the light emitting element.

In the light detecting apparatus, the signal switching unit switches the search operation and servo operation from one to another according to a level of a servo error signal provided by the servo error signal generator. Namely, when an orientation of the light emitting element is found by the search operation, the optical axis of the two-axis deflector can quickly be aligned with the orientation of the light emitting element.

The invention claimed is:

1. A light detecting apparatus comprising:
   a two-axis deflector configured to deflect an incident light beam in a direction defined by two axes;
   a two-dimensional position detector configured to two-dimensionally detect an incident position on the detector of the deflected light beam from the two-axis deflector;
   a search controller configured to generate a search control signal that controls the two-axis deflector; and wherein
   the search controller conducting a search operation for finding an incident direction of a light beam made incident to the two-axis deflector by generating, as the search control signal, two periodic signals having different frequencies, by providing the two-axis deflector with the generated periodic signals, by independently controlling, with the periodic signals, deflective operations of the two-axis deflector along the two axes so that a deflected light beam from the two-axis deflector is made incident to the two-dimensional position detector, and by detecting an incident position of the deflected light beam on the two-dimensional position detector.

2. The light detecting apparatus of claim 1, wherein
   a frequency ratio of the two periodic signals having different frequencies and serving as the search control signal is expressed with a set of disjoint integers; and
   the search controller carries out the search operation at a first resolution that is proportional to a product of the disjoint integers, and if the search operation is unable to detect an incident position of a light beam on the two-dimensional position detector, repeats the search operation at a second resolution that is higher than the first resolution.

3. The light detecting apparatus of claim 1, further comprising:
   a servo error signal generator configured to generate, according to an output from the two-dimensional position detector, a servo error signal corresponding to an incident position of a light beam detected on the two-dimensional position detector;
   a servo controller configured to control the two-axis deflector according to the servo error signal so that a light beam is made incident to a predetermined position on the two-dimensional position detector;
   a signal switching unit configured to switch a signal to be input to the two-axis deflector between a signal from the servo controller and a signal from the search controller; and wherein
   the signal switching unit switching, according to a level of the servo error signal generated by the servo error signal generator, the search operation in which a signal from the search controller is input to the two-axis deflector and a servo operation in which a signal from the servo controller is input to the two-axis deflector from one to another.

4. The light detecting apparatus of claim 1, wherein
   the frequency ratio of the two periodic signals is a rational number.

* * * * *